United States Patent [19]
Saitoh

[11] Patent Number: 5,594,865
[45] Date of Patent: Jan. 14, 1997

[54] WATCHDOG TIMER THAT CAN DETECT PROCESSOR RUNAWAY WHILE PROCESSOR IS ACCESSING STORAGE UNIT USING DATA COMPARING UNIT TO RESET TIMER

[75] Inventor: Hiroyuki Saitoh, Kawasakia, Japan

[73] Assignee: Fujitsu Limited, Kanagawa, Japan

[21] Appl. No.: 621,325

[22] Filed: Mar. 25, 1996

Related U.S. Application Data

[63] Continuation of Ser. No. 987,153, Dec. 8, 1992, abandoned.

[30] Foreign Application Priority Data

Dec. 11, 1991 [JP] Japan ................................ 3-327186

[51] Int. Cl.$^6$ ............................. G01R 31/28; G06F 11/00
[52] U.S. Cl. .......................... 395/185.08; 371/61; 371/62; 395/185.09
[58] Field of Search ................... 395/185.08, 185.09; 371/61, 62

[56] References Cited

U.S. PATENT DOCUMENTS

| | | | |
|---|---|---|---|
| 4,618,953 | 10/1986 | Daniels et al. | 371/12 |
| 4,627,060 | 12/1986 | Huang et al. | 371/16.3 |
| 4,689,766 | 8/1987 | Kent | 371/16.3 |
| 4,752,930 | 6/1988 | Kitamura et al. | 371/62 |
| 4,775,957 | 10/1988 | Yakuwa et al. | 395/575 |
| 4,796,211 | 1/1989 | Yokouchi et al. | 364/569 |
| 4,903,193 | 2/1990 | Nakamura | 395/575 |
| 4,956,842 | 9/1990 | Said | 371/62 |
| 5,014,190 | 5/1991 | Johnson | 395/575 |
| 5,073,853 | 12/1991 | Johnson | 395/575 |
| 5,247,163 | 9/1993 | Ohno et al. | 235/492 |
| 5,278,976 | 1/1994 | Wu | 395/575 |
| 5,379,414 | 1/1995 | Adams | 395/185.08 |
| 5,408,643 | 4/1995 | Katayose | 395/185.08 |
| 5,408,645 | 4/1995 | Ikeda et al. | 395/185.08 |

*Primary Examiner*—Robert W. Beausoliel, Jr.
*Assistant Examiner*—Phillip F. Vales

[57] ABSTRACT

In a watchdog timer circuit for a system having a central processing unit and a storage unit, a watchdog timer is provided, which counts up to a predetermined counter value and generates an alarm signal for the central processing unit when the predetermined counter value has been reached. A reset unit is connected to the watchdog timer to periodically reset the watchdog timer in response to a first reset signal generated by the central processing unit, so that the watchdog timer is reset to an initial state. A data comparing unit is coupled to the storage unit to detect whether or not the storage unit is accessible and output a second reset signal to the watchdog timer each time it is detected that the storage unit is accessible.

11 Claims, 9 Drawing Sheets

WATCHDOG TIMER THAT CAN DETECT PROCESSOR RUNAWAY WHILE PROCESSOR IS ACCESSING STORAGE UNIT USING DATA COMPARING UNIT TO RESET TIMER

This is a continuation, of application Ser. No. 07/987,153, filed Dec. 8, 1992, now abandoned.

BACKGROUND OF THE INVENTION

1. Field of the Invention

The present invention generally relates to watchdog timer circuits, and more particularly a watchdog time circuit that includes two sources for generating reset signals for resetting a watchdog timer.

2. Description of the Prior Art

Watch dog timer circuits including watchdog timers are used to detect runaway of central processing units, microprocessors or the like. Watch dog timer circuits are applied to, for example, data processing systems and communications systems, in which data can be written into a storage unit and read therefrom during a predetermined interval (time window). The watchdog timer circuits detect runaway of the microprocessors of the data processing systems. Normally, while the writing and reading of data is being performed, interrupt requests are not sent to the microprocessor. If the microprocessor accepts an interrupt request, the writing or reading of data is interrupted and error in the data will occur. As will be described in detail later, the microprocessor cannot periodically reset a watchdog timer while the microprocessor is made not to receive any interrupt requests. If the microprocessor runs away while the microprocessor is made not to receive any interrupt requests, the watchdog timer circuit may not detect the runaway of the microprocessor. Hence, it is required to provide a watchdog timer circuit capable of detecting runaway of the microprocessor maintained in the state in which it is made not to receive any interrupt requests.

FIG. 1 is a block diagram of a data processing system including a watchdog timer circuit. The data processing system shown in FIG. 1 comprises a CPU (Central Processing Unit) 11, an interrupt controller 12, a timer 13, a floppy disk controller 16, a status register 17 and a floppy disk drive 18. The watchdog timer circuit built in the data processing system comprises a timer 13, a watchdog timer (WDT) 14, and a WDT control register 15 in addition to the CPU 11 and the timer 13.

The CPU 11 writes data, such as a binary one (a high (H) level signal), into the WDT control register 15 via a bus beforehand. The timer 13 periodically outputs a trigger signal to the interrupt controller 12. In response to the trigger signal, the interrupt controller 12 outputs an interrupt signal IRQ to the CPU 11. The CPU 11 counts how many times the interrupt signal has been repeatedly received, and periodically outputs a reset command to the WDT control register 15 via the bus. When the WDT control register 15 is reset, it outputs a clear signal, such as a binary zero (a low (L) level signal), to the watchdog timer 14. Hence, the watchdog timer 14 is reset before it reaches a predetermined counter value and starts to count pulses generated by a built-in clock generator (not shown).

When the issue of the reset command is delayed and the watchdog timer 14 reaches the predetermined counter value, the watchdog timer 14 outputs a watchdog timer alarm signal to the CPU 11. In response to the alarm signal, the CPU 11 stops operating.

Data can be written into the floppy disk driver 18 or read therefrom during a predetermined period of time (a predetermined time window) of a few us. In order to perform the writing or reading operation, the CPU 11 accesses the status register 17 by a polling process. The CPU 11 sends the floppy disk controller 16 information concerning the read/write condition which indicates whether the read or write operation should be performed and which area data should be written into the floppy disk drive 18 or read therefrom. The floppy disk controller 16 reads one-byte data from the specified area and temporarily stores the read data in a built-in memory. Then, the floppy disk controller 16 writes status information expressed by a logic-high ready signal into the status register 17, and thereby the CPU 11 is informed that the floppy disk controller 16 is ready to handle data. The CPU 11 accesses the status register 17, and reads the contents thereof.

The CPU 11 handles data mounting to one sector by repeatedly performing the above-mentioned operation, and then specifies the next area. When the floppy disk controller 16 is ready to handle data again, it writes the logic-high ready signal into the status register 17. The CPU 11 notes the presence of the logic-high ready signal written into the status register 17, and accesses the floppy disk controller 16 again.

The above-mentioned read or write operation on one sector is repeatedly and successively carried out a predetermined number of times. If the read or write operation is interrupted during the read or write operation, errors will occur in the data written into or read from the floppy disk drive 18. Hence, the CPU 11 controls the interrupt controller 12 so that all interrupt requests are masked until the read or write operation is completed. During the read or write operation, the interrupt request from the timer 13 is not applied to the CPU 11, and hence the CPU 11 cannot manage the watchdog timer 14. Hence, the CPU 11 maintains the watchdog timer 14 in the initial or reset state while the floppy disk drive 18 is being accessed, and the watchdog timer 14 cannot detect whether or not the CPU 11 runs away during that time.

SUMMARY OF THE INVENTION

It is a general object of the present invention to provide a watchdog timer circuit in which the above disadvantages are eliminated.

A more specific object of the present invention is to provide a watchdog timer circuit capable of detecting whether or not a processor has run away while it is accessing a storage device.

The above objects of the present inventions are achieved by a watchdog timer circuit applied to a system having a central processing unit and a storage unit, the watchdog timer circuit comprising: watchdog timer means, coupled to the central processing unit, for counting up to a predetermined counter value and for generating an alarm signal when the predetermined counter value has been reached; reset means, coupled to the central processing unit, for periodically resetting the watchdog timer means in response to a first reset signal generated by the central processing unit, so that the watchdog timer means is reset to an initial state; and data comparing means, coupled to the central processing unit, the storage unit, the watchdog timer means and the reset means, for detecting whether or not the storage unit is accessible and for outputting a second reset signal to the watchdog timer means each time it is detected that the storage unit is accessible.

The above objects of the present invention are also achieved by a watchdog timer circuit applied to a system having a central processing unit and a plurality of storage units, the watchdog timer circuit comprising: watchdog timer means, coupled to the central processing unit, for counting up to a predetermined counter value and for generating an alarm signal when the predetermined counter value has been reached; reset means, coupled to the central processing unit, for periodically resetting the watchdog timer means in response to a first reset signal generated by the central processing unit, so that the watchdog timer means is reset to an initial state; and a plurality of data comparing means, coupled to the central processing unit, the storage units, the watchdog timer means and the reset means, for respectively detecting whether or not the storage units are accessible and for respectively outputting second reset signals to the watchdog timer means each time it is detected that the storage units are accessible.

Another object of the present invention is to provide a data processing system having the above-mentioned watchdog timer circuit.

This object of the present invention is achieved by a data processing system comprising a central processing unit; a storage unit; and a watchdog timer circuit, the watchdog timer circuit being configured in the manner as described above.

BRIEF DESCRIPTION OF THE DRAWINGS

Other objects, features and advantages of the present invention will become more apparent form the following detailed description when read in conjunction with the accompanying drawings, in which.

DESCRIPTION OF THE PREFERRED EMBODIMENTS

Figure 2:
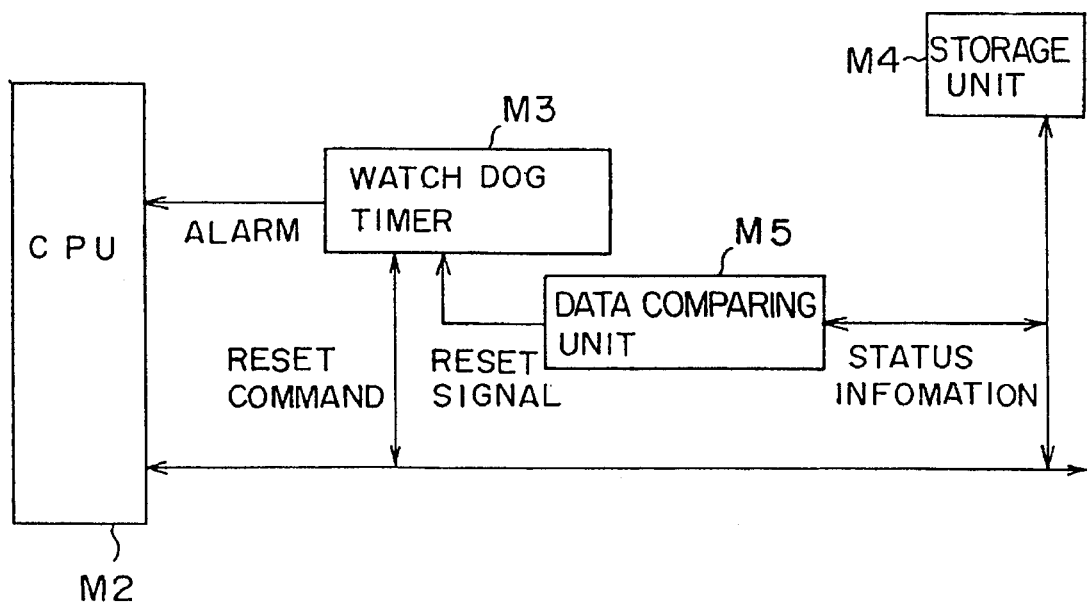
FIG. 2 is a block diagram showing an overview of the present invention.

FIG. 2 is a block diagram illustrating an overview of the present invention. A system shown in FIG. 2 comprises a CPU M2, a watchdog timer M3, a storage unit M4, and a data comparing unit M5. A watchdog timer circuit is comprised of the watchdog timer M3 and the data comparing unit M5. The watchdog timer M3 is periodically reset to the initial state, in response to a reset command issued by the CPU M2, before the watchdog timer M3 reaches a predetermined counter value. When the watchdog timer M3 reaches the predetermined counter value before receiving the reset command from the CPU M2, the watchdog timer M3 generates an alarm signal, which is applied to the CPU M2 and, for example, stops the operation of the CPU M2.

Before the CPU M2 writes data into the storage unit M2 or reads data therefrom, the CPU M2 reads data from a specific storage area in the storage unit M4 by applying an address signal indicating the specific storage area to the storage unit M4. The data comparing unit M5 holds predetermined data indicating that the storage unit M4 is accessible. When the storage unit M4 is actually accessible, the data read from the specific storage area indicates that the storage unit M4 is accessible. In this case, the data comparing unit M5 determines that the storage unit M4 is accessible, and outputs a reset command to the watchdog timer M3. The CPU M2 accesses the storage unit M4 for each sector, and hence the reset command is periodically output to the watchdog timer M3. Hence, the CPU M2 can be periodically and repeatedly reset to the initial state while the CPU M2 is writing data into the storage unit M4 or reading data therefrom.

When the storage unit M4 is not accessible, data read from the specific area in the storage unit M4 indicates that the storage unit M4 is not accessible. At this time, the predetermined data held in the data comparing unit M5 does not coincide with the data read from the specific area in the storage unit M4. Thus, the reset command is not generated by the data comparing unit M5, and the watchdog timer M3 will count up to the predetermined counter value. As a result, the watchdog timer M3 outputs the alarm signal to the CPU M2.

Figure 1:
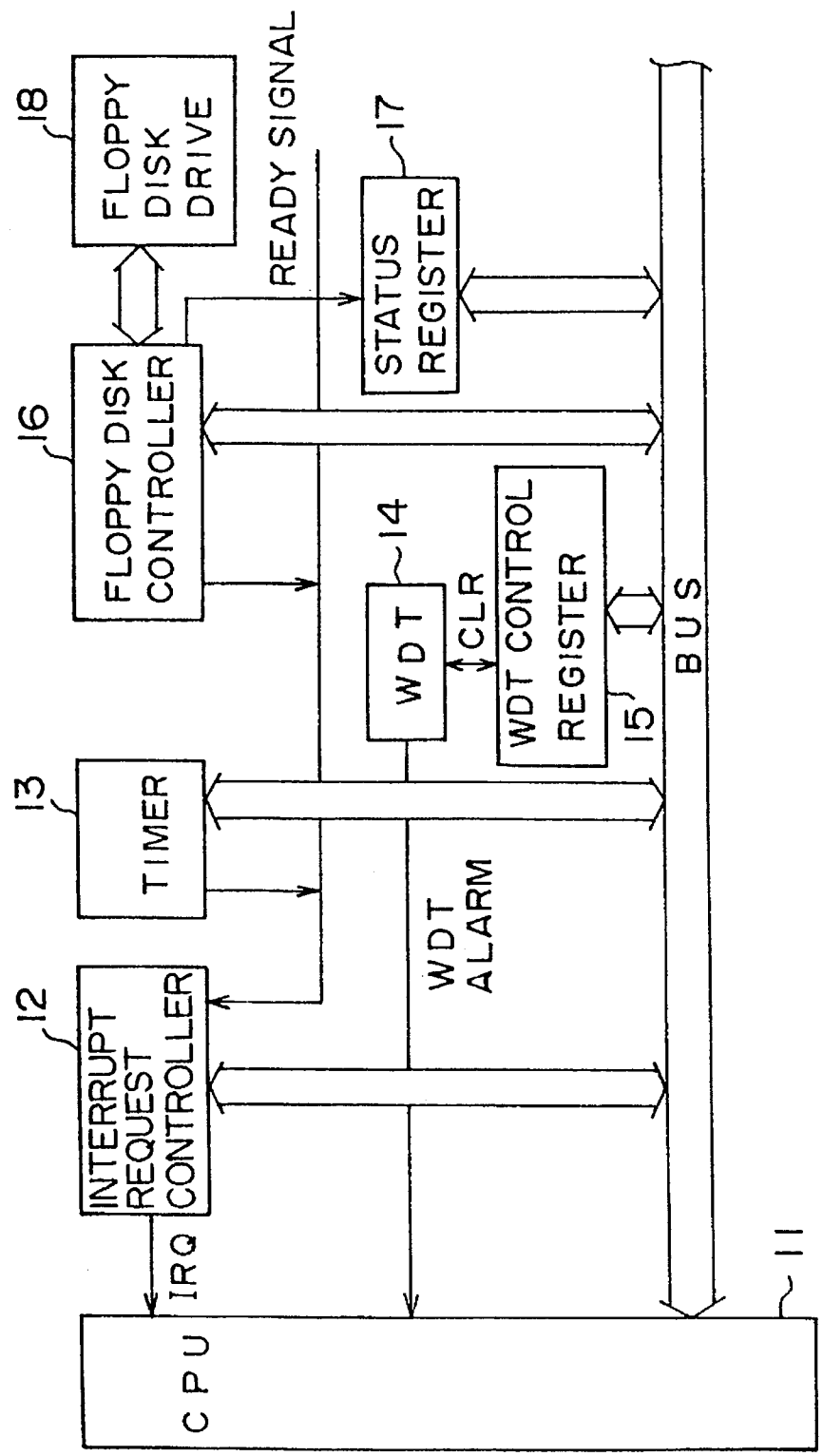
FIG. 1 is a block diagram of a data processing system having a conventional watchdog timer circuit.
Figure 3:
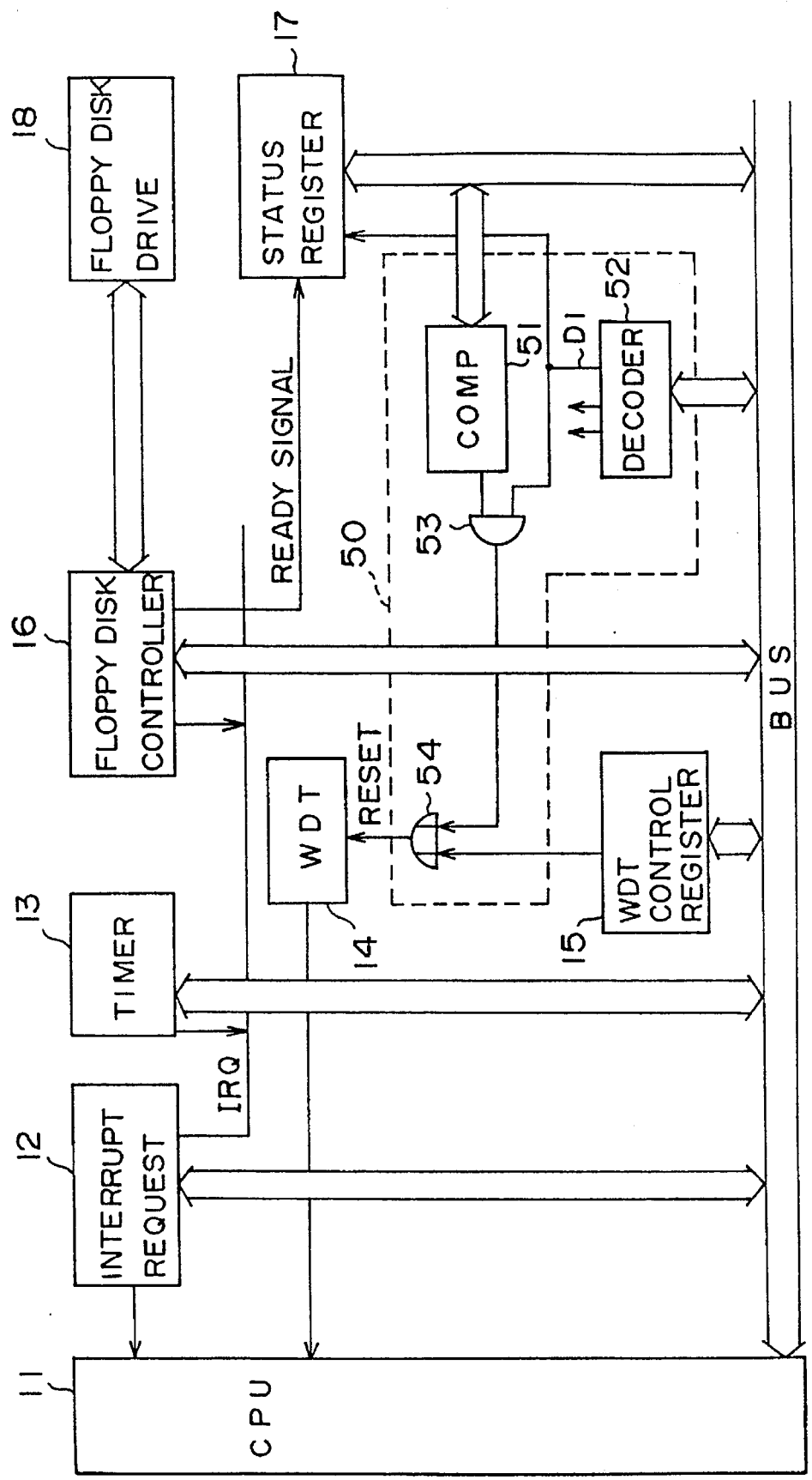
FIG. 3 is a block diagram of a first embodiment of the present invention.

FIG. 3 is a block diagram of a data processing system having a watchdog timer circuit according to a first embodiment of the present invention. In FIG. 3, parts that are the same as parts shown in FIG. 1 are given the same reference numbers as previously. The data processing system shown in FIG. 3 comprises the CPU 11, the interrupt request controller 12, the timer 13, the watchdog timer 14, the WDT control register 15, the floppy disk controller 16, the status register 17 and the floppy disk drive 18.

A data comparing unit 50, which corresponds to the data comparing unit M5 shown in FIG. 2, comprises a comparator 51, a decoder 52, and AND gate 53 and an OR gate 54. The comparator stores predetermined data indicating that the floppy disk drive 18 is accessible. When the decoder 52 receives an address signal supplied from the CPU 11 via the bus and indicative of the status register 17, the decoder 52 generates a decoded address signal having a bit D1 maintained at a predetermined active logic level (high, for example). The bit D1 is applied to the status register 17 and the AND gate 53. The floppy disk controller 16 writes status information into the status register 17. More specifically, the floppy disk controller 16 writes a ready signal, indicating that the floppy disk drive 18 is accessible, into the status register 17 when the floppy disk drive 18 is accessible. The ready signal is, for example, data "01". In response to receipt of the bit D1 set to the active level, the ready signal is read from the status register 17 and is applied to the comparator 51. The comparator 51 compares its own predetermined data ("01" in the example being considered) with the ready signal read from the status register 17. When the predetermined data built in the comparator 51 coincides with the read signal from the status register 17, the comparator 51 outputs a logic-high signal to the AND gate 53. Since the bit D1 is maintained at the high level, the output signal of the AND gate is maintained at the high level. The logic-high output signal of the AND gate 53 passes through the OR gate 54, and is applied, as the reset signal, to the watchdog timer 14.

Figure 4:
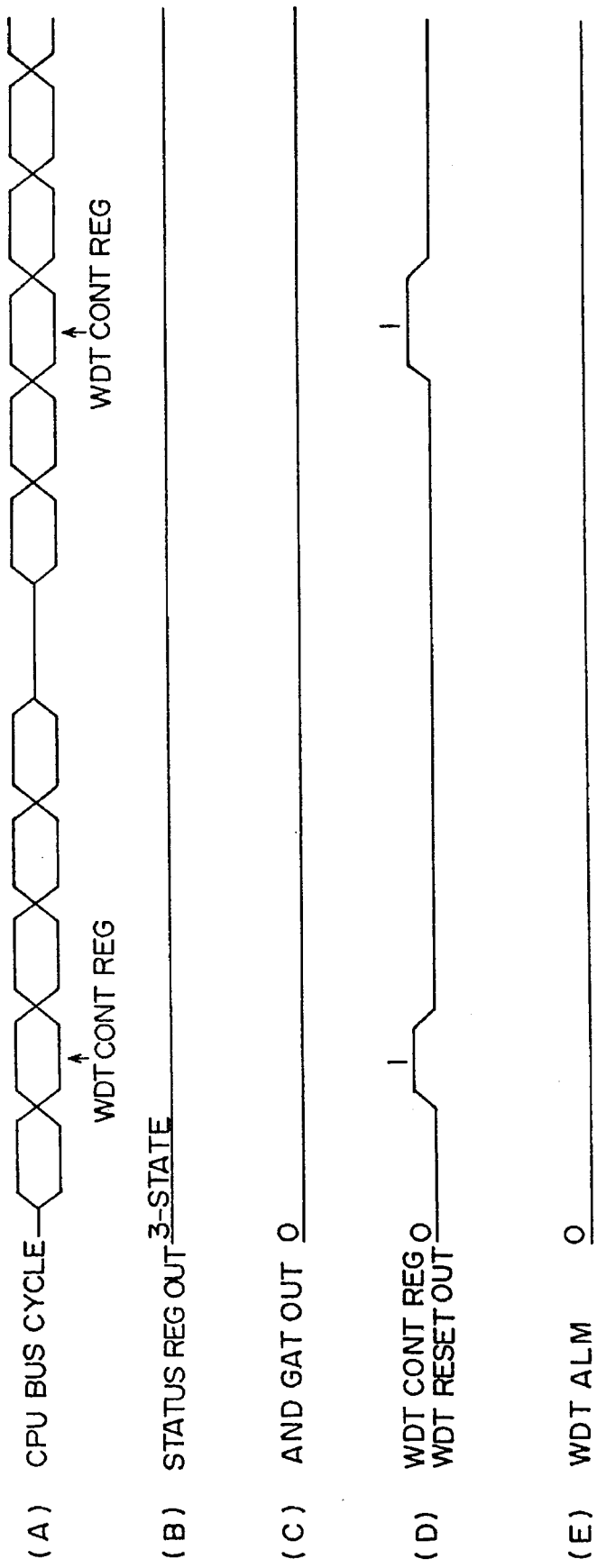
FIG. 4 is a timing chart showing a first operation of the embodiment shown in FIG. 3.

FIG. 4 is a timing chart showing the operation of the system in which the CPU 11 is normally operating without accessing the floppy disk drive 18. FIG. 4-(A) shows a CPU bus machine cycle, (B) shows the output signal of the status register 17 (STATUS REG OUT), (C) shows the output signal of the AND gate 53 (AND GAT OUT), (D) shows the output signal of the WDT control register 15 (WDT CONT REG-WDT RESET OUT), and (E) shows the alarm signal generated by the watchdog timer 14. The CPU 11 periodically writes the reset command ("1") into the WDT control register 15 before the watchdog timer 14 counts up to the predetermined counter value. Hence, the alarm signal shown in (E) of FIG. 4 continues to indicate "0", and hence the alarm signal is OFF.

Figure 5:
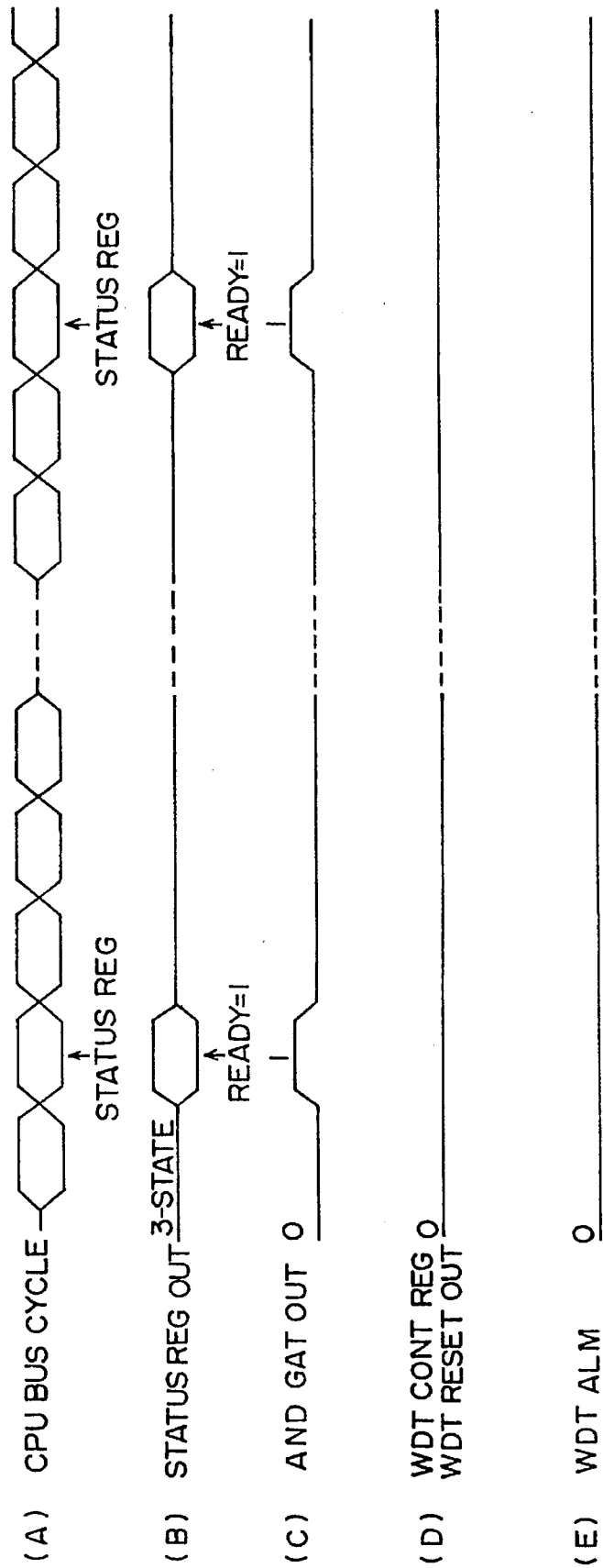
FIG. 5 is a timing chart showing a second operation of the embodiment shown in FIG. 3.

FIG. 5 shows the operation of the system in which the CPU 11 is normally accessing the floppy disk drive 18 via the floppy disk controller 16. The CPU 11 periodically accesses the status register 17 via the decoder 52, and the ready signal (=01) is periodically read from the status register 17 as shown in (B) of FIG. 5. Hence, the output signal of the AND gate 53 is periodically switched to "1", and is applied to the watchdog timer 14 via the OR gate 54. Hence, the watchdog timer 14 is periodically reset to the initial state before it reaches the predetermined counter value, and the alarm signal is OFF. It should be noted that, as shown in (D) of FIG. 5, the CPU 11 does not write the reset command into the WDT control register 15 while the floppy disk drive 18 is being accessed.

Figure 6:
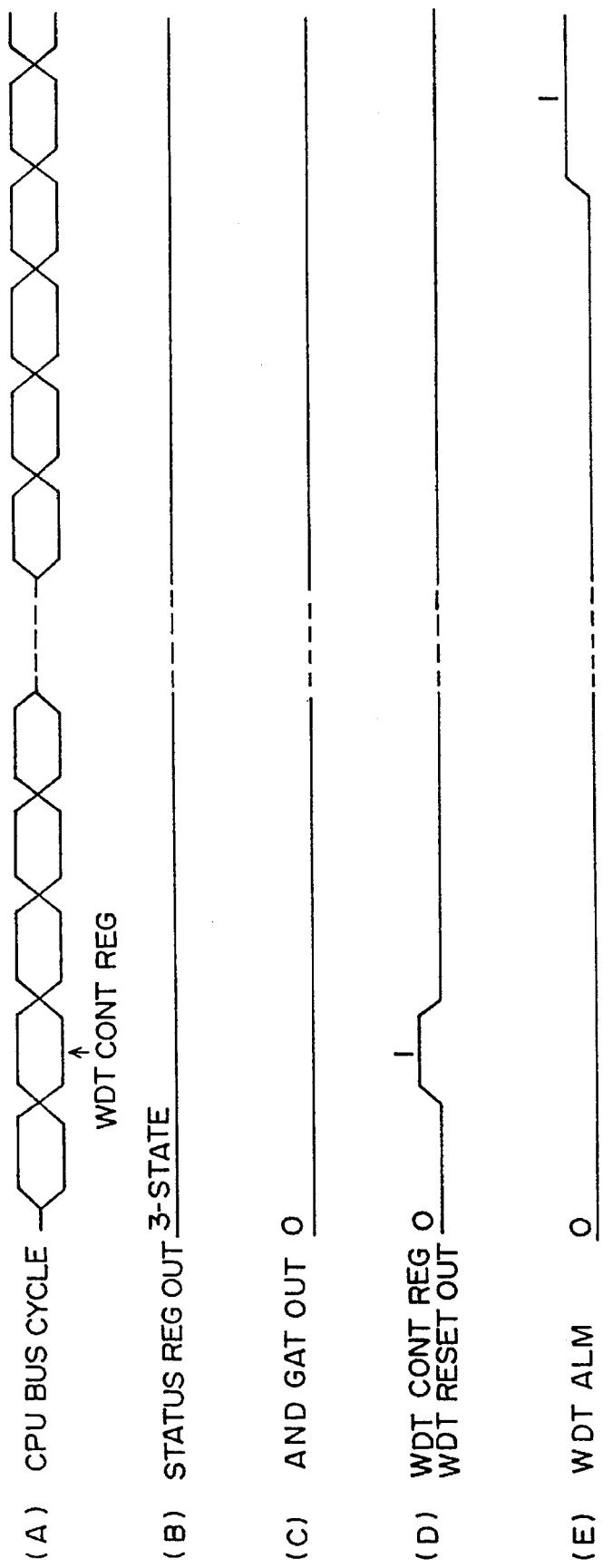
FIG. 6 is a timing chart showing a third operation of the embodiment shown in FIG. 3.

FIG. 6 shows the operation of the system in which the CPU 11 malfunctions when it is operating without accessing the floppy disk drive 18. The CPU 11 does not write the reset command into the WDT control register 15 after writing the reset command shown in (D) of FIG. 6 therein. Hence, the watchdog timer 14 is not reset to the initial state, and counts up to the predetermined counter value. At this time, the watchdog timer 14 switches the level of the alarm signal from "0" to "1", so that the alarm signal is turned ON.

Figure 7:
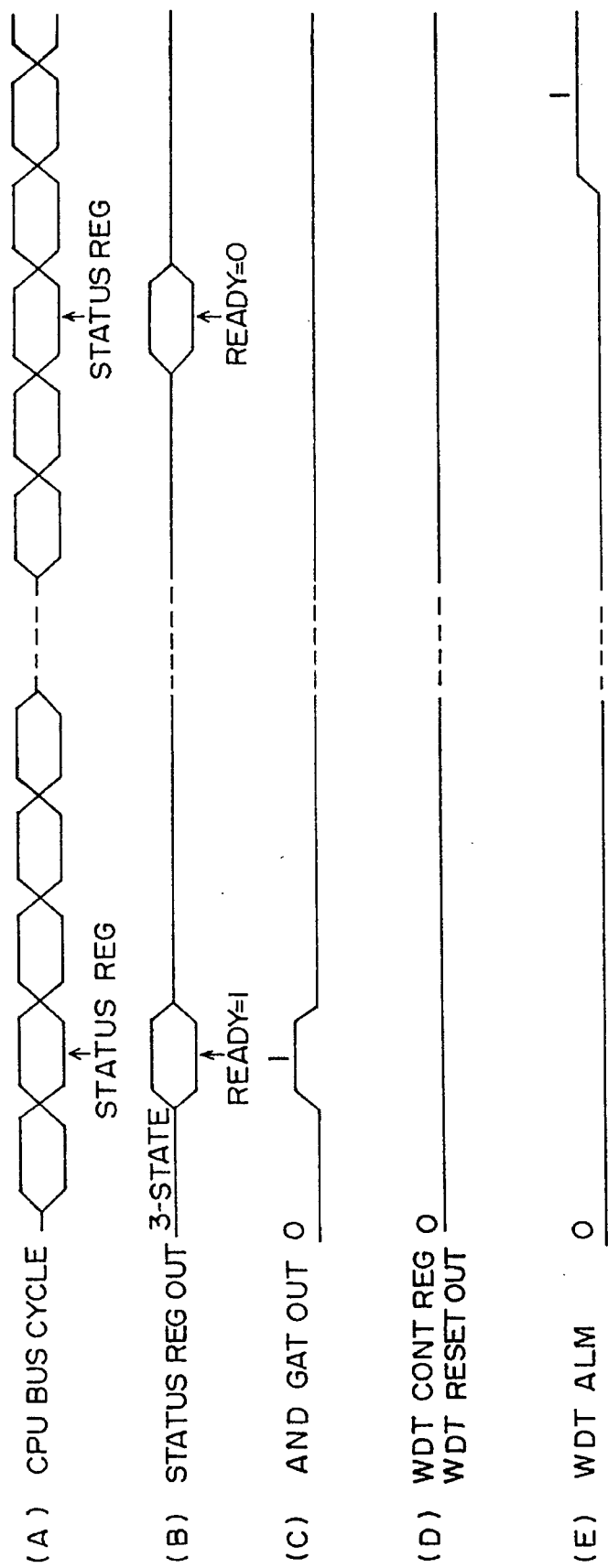
FIG. 7 is a timing chart showing a fourth operation of the embodiment shown in FIG. 3.

FIG. 7 shows the operation of the system in which an access error has occurred while data is being written into or read from the floppy disk drive 18, and therefore the floppy disk controller 16 turns the ready signal OFF (switches from "1" to "0"), while the CPU 11 does not issue the reset command since the floppy disk drive 18 is being accessed. As shown in (B) of FIG. 7, "0" is written into the status register 17. Hence, the watchdog timer 14 is not supplied with the reset command and counts up to the predetermined counter value. Hence, the watchdog timer 14 turns the alarm signal ON, as shown in (E) of FIG. 7.

Figure 8:
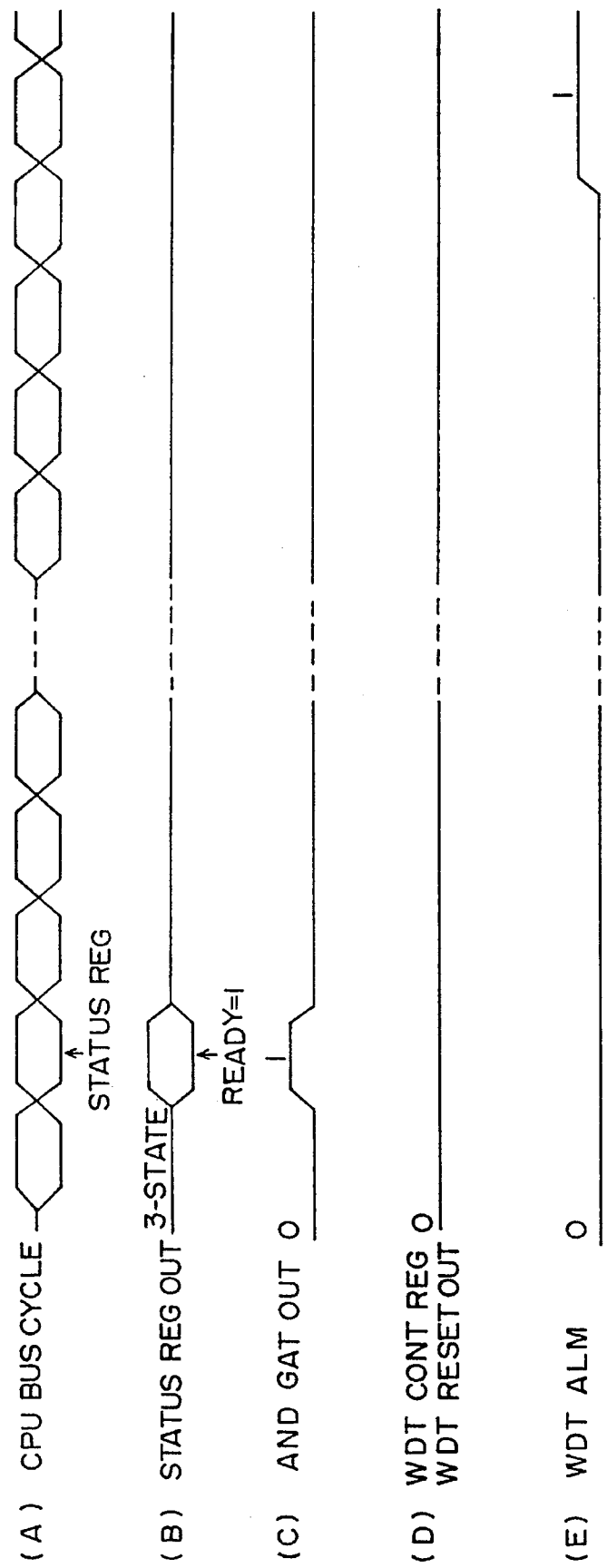
FIG. 8 is a timing chart showing a fifth operation of the embodiment shown in FIG. 3.

FIG. 8 shows the operation of the system in which the CPU 11 runs away while the floppy disk drive 18 is being accessed. The CPU 11 runs away and does not output the address signal indicative of the status register 17 to the decoder 52. Hence, the ready signal (which is "1") cannot be read from the status register 17, and the output signal of the AND gate 53 is not switched to "1", as shown in (B) and (C) of FIG. 8. Hence, the watchdog timer 14 counts up to the predetermined counter value, and the alarm signal is turned ON, as shown in FIG. (E) of FIG. 8.

Figure 9:
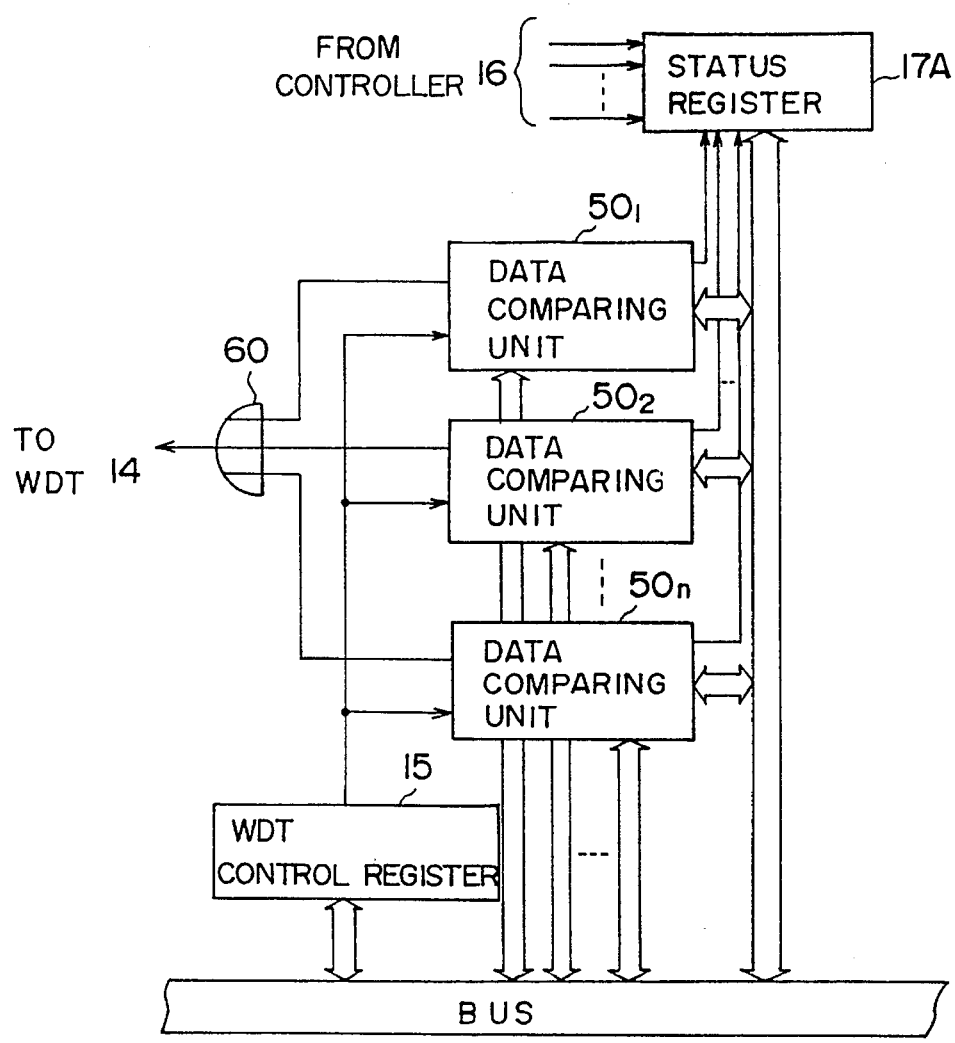
FIG. 9 is a block diagram of a second embodiment of the present invention.

FIG. 9 is a block diagram of a second embodiment of the present invention, in which n floppy disk drives are provided in the system where n is an integer. A status register 17A has n register areas respectively related to the n floppy disk drives, and receive n ready signals from the floppy disk controller 16. As shown in FIG. 9, n data comparing units $50_1, 50_2, \ldots, 50_n$ are provided. Each of the units $50_1$–$50_n$ is configured as shown in FIG. 3. The decoders in the units $50_1$–$50_n$ decode respective address signals related to the register areas of the status register 17A. An OR gate 60 receives the output signals of the OR gates 54 in the units $50_1$–$50_n$, and sends an output signal to the watchdog timer 14 as a reset signal.

Figure 10:
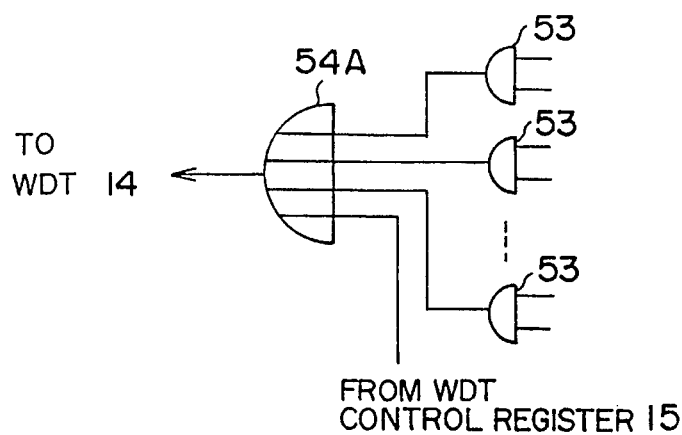
FIG. 10 is a block diagram of a variation of the second embodiment of the present invention.

As shown in FIG. 10, it is possible to omit the OR gate 60 shown in FIG. 9. The output terminals of the n AND gates of the units $50_1$–$50_n$ are connected to an OR gate 54A, which also receives the reset command from the WDT control register 15.

The present invention is not limited to the specifically disclosed embodiments, and variations and modifications may be made without departing from the scope of the present invention.

What is claimed is:

1. A watchdog timer circuit for a system including a central processing unit and a storage unit, wherein said central processing unit accesses said storage unit during predetermined time intervals and does not accept an interrupt request when accessing the storage unit, to avoid errors in data being processed, said watchdog timer circuit comprising:

watchdog timer means, coupled to the central processing unit, for counting up to a predetermined counter value and for generating an alarm signal when the predetermined counter value has been reached;

reset means, coupled to the central processing unit and to the watchdog timer means, for periodically resetting the watchdog timer means in response to a first reset signal generated by the central processing unit, so that the watchdog timer means is reset to an initial state; and data comparing means, coupled to the central processing unit, the storage unit, the watchdog timer means and the reset means, for detecting whether or not the storage unit is accessible and for outputting a second reset signal to the watchdog timer means each time it is detected that the storage unit is accessible so that the watchdog timer means is caused to be reset by said second reset signal output from said data comparing means so that the watchdog timer means continues to operate while the central processing unit is accessing the storage unit.

2. The watchdog timer circuit as claimed in claim 1, wherein said data comparing means comprises data comparing means for comparing predetermined data indicating that the storage unit is accessible with data read from a specific area in the storage unit and for outputting the second reset signal to the watchdog timer means when the data read from the specific area coincides with the predetermined data.

3. The watchdog timer circuit as claimed in claim 1, further comprising OR gate means for applying the first reset signal and the second reset signal to the watchdog timer means.

4. The watchdog timer circuit as claimed in claim 1, wherein the storage unit comprises a status register for storing status information indicative of the status of the storage unit, and wherein the data comparing means comprises:

decoder means for decoding an address signal generated by the central processing unit and indicative of the status register and for applying a decoded address signal to the status register so that a ready signal indicative of said status information of the storage unit is read from the status register; and comparator means for comparing the ready signal read for comparing the ready signal read from the status register with predetermined data indicating that the storage unit is accessible and for generating the second reset signal in response to the decoded address signal when the ready signal coincides with the predetermined data.

5. The watchdog timer circuit as claimed in claim 4, wherein said comparator means comprises:

first means for comparing the ready signal with the predetermined data indicating that the storage unit is accessible and for generating a comparison output signal; and second means for performing a logic AND operation on the decoded address signal and the comparison output signal and for generating the second reset signal based on a result of the logic AND operation.

6. The watchdog timer circuit as claimed in claim 4, wherein the decoder means comprises means for applying a predetermined one of bits forming the decoded address signal to the status register.

7. A watchdog timer circuit in combination with a system including a central processing unit and a plurality of storage units wherein said central processing unit accesses said storage unit during predetermined time intervals and does not accept an interrupt request when accessing said plurality of storage units to avoid errors in data being processed, said watchdog timer circuit comprising:

watchdog timer means, coupled to the central processing unit, for counting up to a predetermined counter value and for generating an alarm signal when the predetermined counter value has been reached;

reset means, coupled to the central processing unit and to the watchdog timer means, for periodically resetting the watchdog timer means in response to a first reset signal generated by the central processing unit, so that the watchdog timer means is reset to an initial state; and a plurality of data comparing means, coupled to the central processing unit, the storage units, the watchdog timer means and the reset means, for respectively detecting whether or not the storage units are accessible and for respectively outputting second reset signals to the watchdog timer means each time it is detected that the storage units are accessible so that the watchdog timer means is caused to be reset by said second reset signals output from said plurality of data comparing means such that the watchdog timer continues to operate while the central processing unit is accessing said storage units.

8. The watchdog timer circuit as claimed in claim 7, wherein said plurality of data comparing means respectively comprise data comparing means for comparing pieces of predetermined data respectively indicating that the storage units are accessible with pieces of data respectively read from specific areas in the storage units and for respectively outputting the second reset signals to the watchdog timer means when the pieces of data respectively read from the specific areas coincide with the pieces of predetermined data.

9. The watchdog timer circuit as claimed in claim 7, further comprising OR gate means for applying the first reset signal and the second reset signals to the watchdog timer circuit.

10. A data processing system comprising:

a central processing unit;

a storage unit, said central processing unit accessing said storage unit during predetermined intervals and does not accept an interrupt request when accessing said storage unit to avoid errors in data being processed; and a watchdog timer circuit, said watchdog timer circuit comprising:

watchdog timer means, coupled to the central processing unit, for counting up to a predetermined counter value and for generating an alarm signal when the predetermined counter value has been reached;

reset means, coupled to the central processing unit and to the watchdog timer means for periodically resetting the watchdog timer means in response to a first reset signal generated by the central processing unit, so that the watchdog timer means is reset to an initial state; and data comparing means, coupled to the central processing unit, the storage unit, the watchdog timer means and the reset means, for detecting whether or not the storage unit is accessible and for outputting a second reset signal to the watchdog timer means each time it is detected that the storage unit is accessible so that the watchdog timer means is caused to be reset by said second reset signal output from said data comparing means such that the watchdog timer means continues to operate while the central processing unit is accessing said storage unit.

11. A data processing system comprising:

a central processing unit;

a plurality of storage units, said central processing unit accessing said plurality of storage units during predetermined time intervals and does not accept an interrupt request when accessing said storage units to avoid errors in data being processed; and a watchdog timer circuit, said watchdog timer circuit comprising:

watchdog timer means, coupled to the central processing unit, for counting up to a predetermined counter value and for generating an alarm signal when the predetermined counter value has been reached;

reset means, coupled to the central processing unit and the watchdog timer means, for periodically resetting the watchdog timer means in response to a first reset signal generated by the central processing unit, so that the watchdog timer means is reset to an initial state; and a plurality of data comparing means, coupled to the central processing unit, the storage units, the watchdog time means and the reset means, for respectively detecting whether or not the storage units are accessible and for respectively outputting second reset signals to the watchdog timer means each time it is detected that the storage units are accessible so that the watchdog timer means is caused to be reset by said second reset signals output from said plurality of data comparing means to that the watchdog timer means continues to operate while the central processing unit is accessing said plurality of storage units.

* * * * *